Feb. 14, 1933.    F. LJUNGSTRÖM    1,897,506

ENGINE DRIVEN DRIVING MECHANISM

Filed June 29, 1929    3 Sheets-Sheet 1

INVENTOR
Fredrik Ljungström
BY
his ATTORNEY

Feb. 14, 1933.   F. LJUNGSTRÖM   1,897,506
ENGINE DRIVEN DRIVING MECHANISM
Filed June 29, 1929   3 Sheets-Sheet 2

INVENTOR
Fredrik Ljungström
BY
ATTORNEY

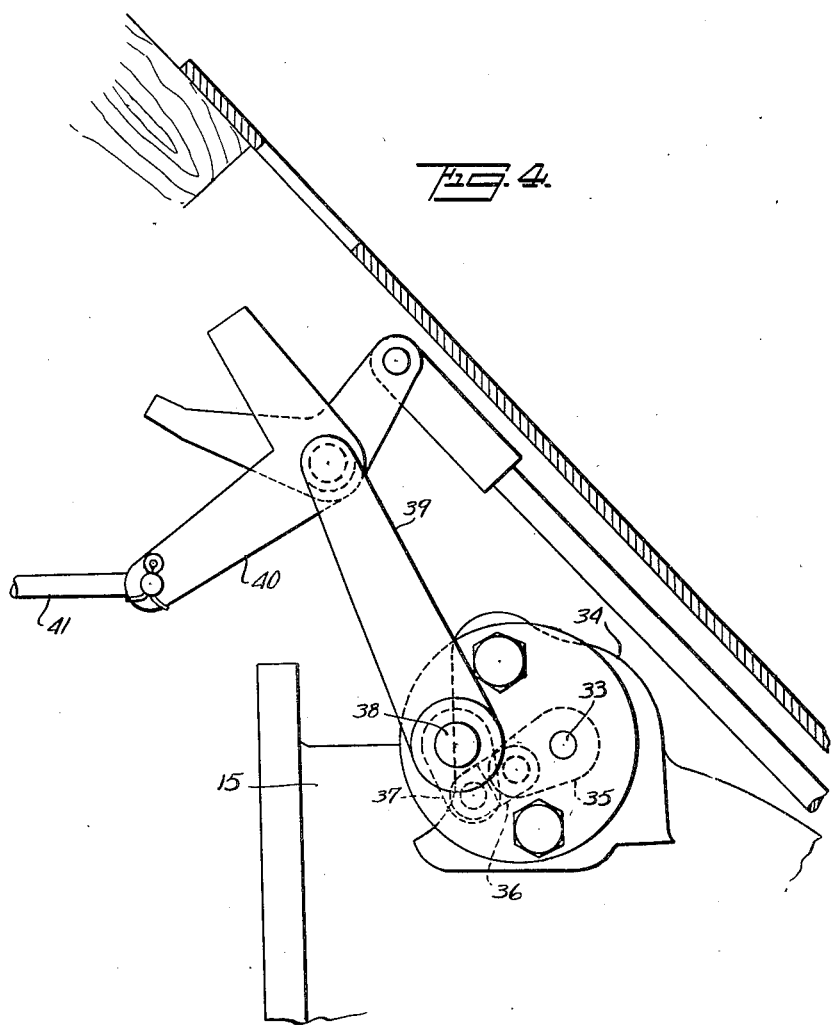

Patented Feb. 14, 1933

1,897,506

UNITED STATES PATENT OFFICE

FREDRIK LJUNGSTRÖM, OF STOCKHOLM, SWEDEN, ASSIGNOR, BY MESNE ASSIGNMENTS, TO PED, INCORPORATED, A CORPORATION OF DELAWARE

ENGINE-DRIVEN DRIVING MECHANISM

Application filed June 29, 1929, Serial No. 374,830, and in Sweden July 3, 1928.

The present invention relates to engine-driven power transmitting mechanisms of the type adapted to be used in self-propelled vehicles. More specifically, the invention relates to variable-speed power transmissions adapted to transmit power from internal combustion engines. Still more specifically the invention relates to variable-speed power transmissions in which continuous driving torque derived from an engine is converted, under certain conditions of drive, into turning moments of alternately opposite sense, the turning moments of one selected sense being transmitted to a driven member and the turning moments of the sense opposite the selected sense being transmitted to an abutment.

The principal object of the invention is to provide means operating in conjunction with power transmissions and variable-speed power transmissions of the character referred to for decreasing the power delivered by the engine operating the transmission when the forces developed in connection with the transmission of power reach or exceed a value which might cause damage to the transmission.

I attain the above mentioned principal object by providing means controlling the amount of power developed by the engine, said means being actuated by a part of the transmission movement of which is indicative of the value of the force or forces being transmitted by the transmission. In cases where power from an internal combustion engine is being transmitted, the power control means is preferably in the form of mechanism controlling the fuel supply to the engine.

I have illustrated the invention as applied to a variable-speed power transmission of the general form disclosed in Patent No. 1,810,283, granted to me June 16, 1931, and the several objects of the invention, including the more specific objects not mentioned above, together with the advantages to be derived from the use of the invention, will become apparent from the ensuing detailed description of the illustrative example shown in the accompanying drawings forming a part of this specification.

In the drawings, Fig. 1 is a central longitudinal section of the transmission;

Fig. 4 is a side elevation on an enlarged scale of part of the mechanism shown in Fig. 2.

Figure 1:
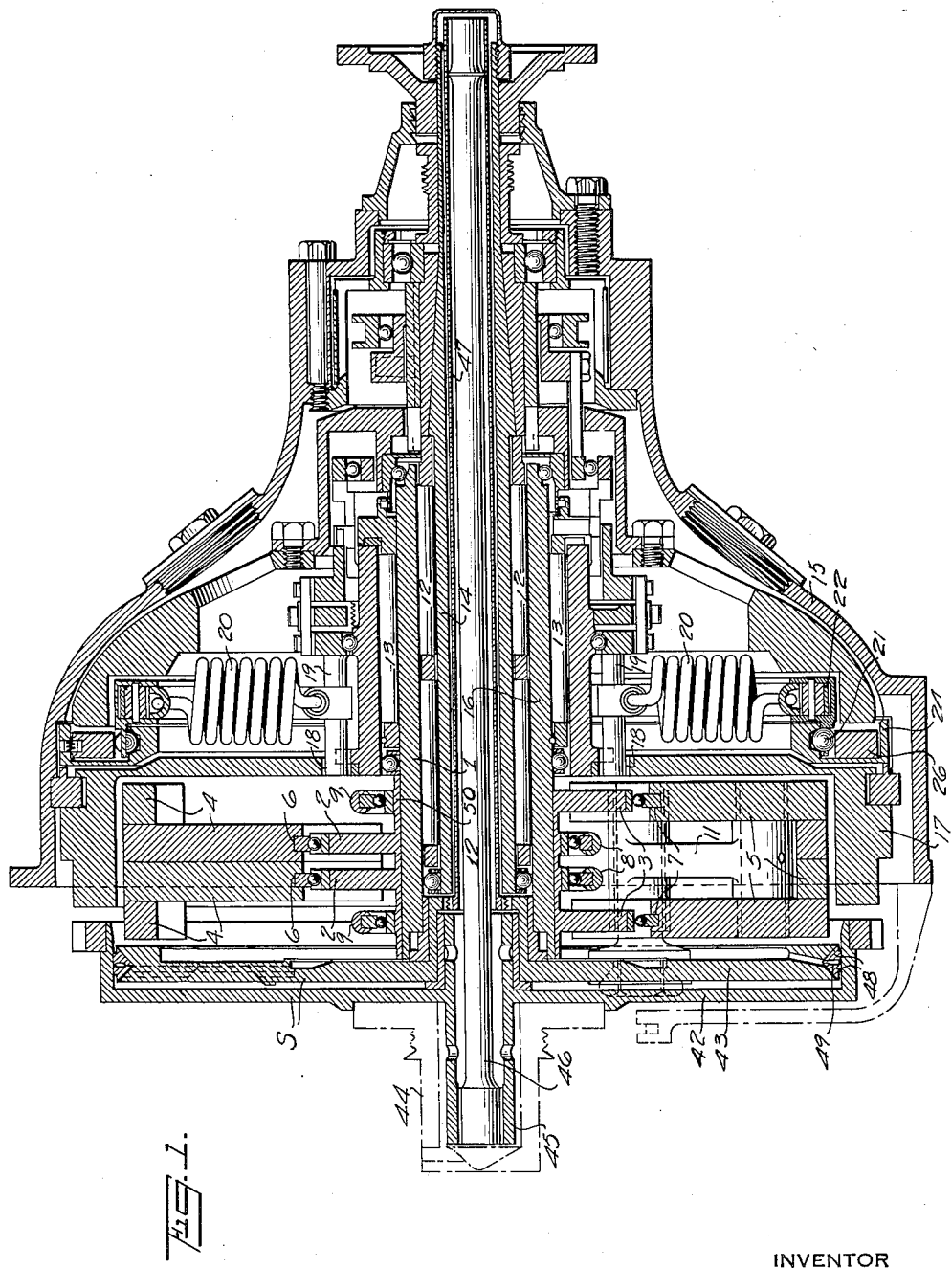

Referring now to the drawings, the transmission illustrated is, in general, the same as that illustrated in my copending application above referred to, and comprises clutch mechanism including a common clutch sleeve 1 to which are secured eccentrics 2 and 3. Rotatably mounted upon these eccentrics by means of ball bearings 6 and 7 and U-shaped clamps 8 and 9 (see Fig. 2) are the respective inertia weights or masses 4 and 5. These masses are connected to the driving member, which in the present instance is in the form of fly-wheel unit S, by means of links 10 and 11 respectively. The fly-wheel unit S is composed of two separate fly-wheels 42 and 43 connected in a manner to be hereinafter more fully described.

When the fly-wheel unit S is rotated at a speed other than that at which the clutch sleeve 1 rotates, the inertia masses 4 and 5 produce and apply to said sleeve alternate turning moments of opposite sense, and from said sleeve the turning moments of one sense are transmitted through suitable clutch mechanism to the driven member 14, while the turning moments of the opposite sense are transmitted to the abutment formed by the transmission casing 15. The driven member in this embodiment is in the form of a sleeve rigidly connected to and in effect forming part of the shaft driven by the transmission. When the fly-wheel unit S and the clutch sleeve 1 are rotating at the same speed, the inertia masses 4 and 5 apply a continuous turning moment of one sense to to the sleeve, which turning moment is transmitted to the driven member 14, while the clutch mechanism for transmitting moments of opposite sense to the abutment overruns continuously.

The common clutch sleeve 1 and the driven member 14 form, with a plurality of gripping detents 12, a clutch which I will term an action clutch for transmitting turning moments of one sense to the driven member, while the common sleeve 1 and the sleeve 16 form, with the detents 13, a clutch which I will term a reaction clutch for transmitting turning moments of the opposite sense to the abutment. Members 14 and 16 each are provided with oppositely inclined gripping surfaces adapted to be engaged alternatively by the detents to transmit forces in selected direction through each of the clutches. The oppositely inclined gripping surfaces permit, by a turning movement of the clutch detents with respect to the gripping surfaces, reversal of the direction or sense in which the clutches will transmit force, and mechanism is provided for adjusting the detents so that the clutches grip and overrun in opposed directions under all conditions of drive.

The general arrangement of the mechanism for alternately producing turning moments of opposite sense and of segregating such moments by means of clutch mechanism to secure drive in selected directions of the driven member, is fully described in Patent No. 1,810,283 above referred to, as is also the general construction of the reversible clutches and the manner of reversing them. Reference may be had to this patent for a more detailed description of these parts of the apparatus.

In order to alter the characteristics of the turning moments transmitted to the abutment 15 when the transmission is operating asynchronously and to eliminate possible vibration due to forces so transmitted to the abutment, a mass 17, which I will term a reaction inertia mass, is resiliently mounted with respect to the casing 15 so as to be capable of limited turning movement but not rotation with respect to the casing. This mass is rigidly connected to the reaction clutch sleeve 16. The manner in which this mass functions to produce the desired result is fully described in the patent above referred to.

At the inner periphery of said reaction mass 17 near the clutch sleeve 16 there are holes 18, in the present case six holes uniformly distributed over the periphery, and engaging said holes with limited play in peripheral direction is a corresponding number of pins 19 forming supports for the inner ends of coil springs 20 the outer ends of which are pivotally connected with a ring 22 formed as a holder for balls 21. Said balls 21 are placed in a groove 23 in another ring 24 essentially U-shaped in cross section and encircling a third ring 26 split at a point 25. The two latter rings 24 and 26 are prevented from rotating by pin bolts 27 engaging same, the outer ends of said bolts being placed in the stationary frame 15 and actuated by relatively strong pressure springs 28 which are housed in casings 29 formed on the frame and help in compressing the ring 26.

Figure 3:
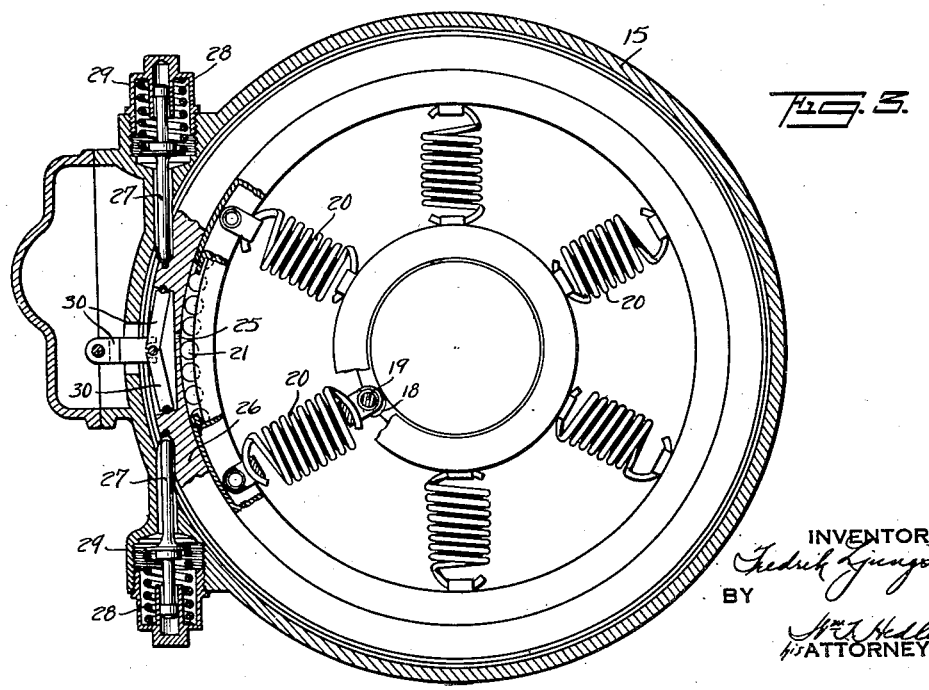
Fig. 3 is another transverse section of the device shown in Fig. 1.

When the split ring 26 by its spring action presses the balls 21 against the walls of the groove 23 in the ring 24 the ball holder ring 22 is also locked against rotation, and deflection of the reaction mass 17 in the one direction or other is under normal conditions only possible to the degree that this is permitted by the play of the holes 18 and the tension of the springs 20. The release of the ball holder ring 22 and, thus, of the mass 17 takes place by expansion of the split ring 26 by means of the toggle device 30 shown in Fig. 3.

The turning moments transmitted to the reaction mass 17 are, after their character is altered thereby, transmitted by way of springs 20 to the releasable coupling formed by the ring members 22, 24 and 26 and therefrom through the pin bolts 27 and springs 28 to the frame 15 which forms the abutment finally receiving these forces. Springs 28 should be of such strength that under normal conditions, that is, when the turning moments are of or below a predetermined value, the movement of rings 24 and 26 with respect to the frame 15 is extremely small, and exceeds a predetermined value only when the turning moments reach a dangerously high value.

Assuming that, with the engine developing maximum power, drive through the transmission is resisted by high torque, the turning moments may reach a value such that likelihood of damage to the transmission arises. Under such conditions, the forces transmitted to the ring members 24 and 26 overcome the resistance of one of the springs 28 to such a degree that the spring is compressed to a material degree and substantial movement of the rings with respect to the frame will occur.

This turning movement, is according to the invention in the embodiment shown, utilized to actuate automatically the fuel controlling device of the engine to decrease the fuel supply.

Figures 2, 2A:
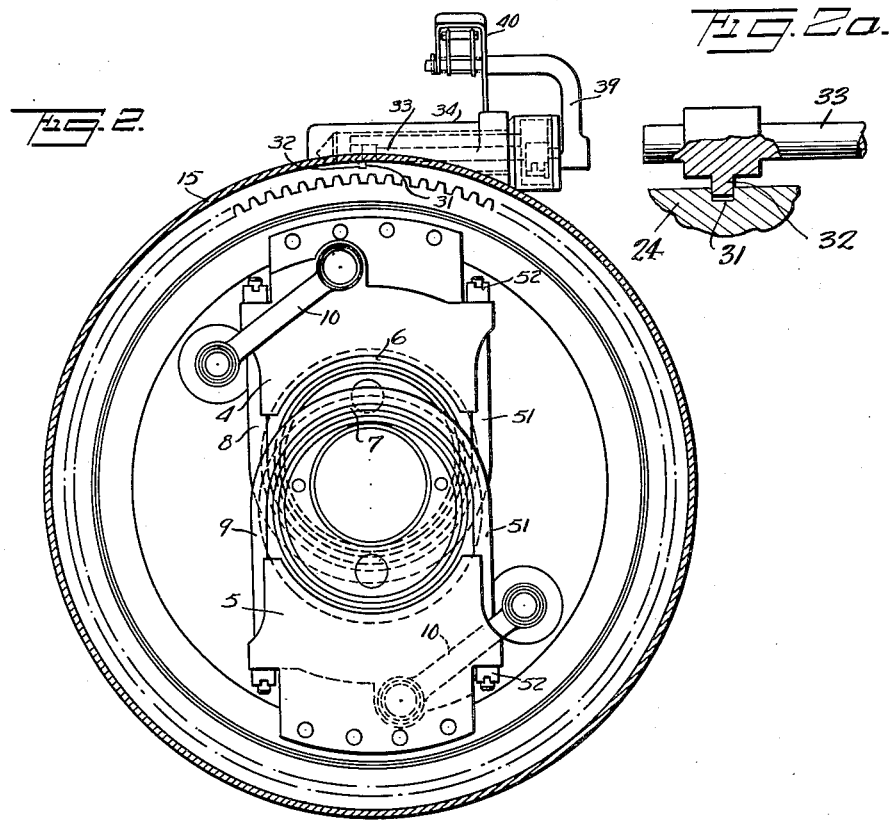
Fig. 2 is a transverse view of part of the transmission shown in Fig. 1.
Fig. 2a is a detail on an enlarged scale of part of the mechanism shown in Fig. 2.

To this end an obliquely directed groove 31 (see Fig. 2a) is provided in the periphery of the U-shaped ring 24, and engaging this groove is a correspondingly shaped tooth 32 connected with a shaft 33 which is rotatably mounted in a casing 34 formed on the frame 15, Fig. 2. Secured to the shaft 33 is a crank 35, Fig. 4, which is connected by means of a link 36 with another crank 37 secured to a shaft 38 is further an arm 39, Figs. 2 and 4, and rotatably mounted on the horizontal shank of said arm is a bell crank lever 40, the one arm of which is pivotally connected with the controlling rod 41 for the throttle of the engine.

By reference to Fig. 4 it will be seen that links 35 and 36 form a toggle connection between shaft 33 and link 37, so that rotation of shaft 33 in either direction will cause turning movement of link 37 in clockwise direction about shaft 38. Further, it will be seen that the initial turning movement of links 35 and 36, due to turning of shaft 33 away from its normal or mid position, will cause an extremely small movement of link 37. From this it will be seen that appreciable actuation of the throttle control rod 41 does not occur in response to the small turning movements of shaft 33 which occur during normal operation of the transmission. When, however, the turning moments transmitted to the abutment exceed the predetermined value limiting normal operation of the transmission, the greater movement of rings 24 and 26 permitted by the compression of one of the springs 28 causes the groove 31 and tooth 32 to act as a worm imparting a considerable turning movement to shaft 33. When this action occurs, arm 39 is swung in a direction causing the engine throttle to be moved towards closed position, and as previously noted, this movement of the throttle is effected irrespective of the direction of turning movement imparted to shaft 33. By closing the throttle, the transmission is relieved from abnormal stresses and as soon as the value of the turning moments transmitted to the abutment returns to normal, the rings 24 and 26 are returned by springs 28 to their normal or mid position, and the throttle control mechanism is also returned to its normal position.

It is evident that the invention may be applied to engine vehicles of any kind independent of the construction of the transmission, it being only necessary to take the required movement of control from a member actuated by any of the parts of the driving mechanism and re-acting on, for instance, the energy supply of the engine, when the driving power or the load increases beyond a given limit, so that said supply is decreased.

Having thus described my invention, what I claim is:—

1. Apparatus of the character described comprising a power transmitting mechanism of the type alternately producing turning moments of opposite sense, a driving member for delivering power to said mechanism and means responsive to values of the turning moments of one sense for reducing the amount of power delivered by said member when the value of the turning moments of said one sense reaches a predetermined value.

2. Apparatus of the character described comprising an engine-driven variable-speed power transmission, said transmission being capable of alternately producing turning moments of opposite sense, means for controlling the fuel supply to the engine, and means actuated in response to turning moments of one sense having a value exceeding a predetermined value for operating said fuel control means to decrease the power developed by the engine.

3. Apparatus of the character described comprising a variable-speed power transmission, a driving member for delivering power to said transmission, said transmission comprising a driven member, an abutment, mechanism for alternately producing turning moments of opposite sense and mechanism for transmitting the produced opposite turning moments to the driven member and to the abutment respectively, and means responsive to the turning moments transmitted to the abutment for reducing the power delivered by said driving member when the turning moments transmitted to the abutment exceed a predetermined value.

4. Apparatus of the character described comprising an engine-driven variable-speed power transmission, said transmission comprising a member driven by the engine, a driven member, an abutment, mechanism actuated by the engine-driven member for alternately producing turning moments of opposite sense, mechanism for transmitting the produced alternate turning moments to the driven member and to the abutment respectively, and means acting in response to the turning moments transmitted to the abutment when they exceed a predetermined value for reducing the fuel supply to the engine.

5. Apparatus of the character described comprising an engine-driven variable-speed power transmission, said transmission comprising a member driven by the engine, a driven member, an abutment, mechanism actuated by the engine-driven member for alternately producing turning moments of opposite sense, mechanism for transmitting the produced alternate turning moments to the driven member and to the abutment respectively, said mechanism including members forming a releasable coupling, said members being capable of limited turning movement, and means actuated by a predetermined amount of movement of said members for decreasing the fuel supply to the engine.

6. Apparatus of the character described comprising an engine-driven variable-speed power transmission, said transmission comprising a member driven by the engine, a driven member, an abutment, mechanism actuated by the engine-driven member for alternately producing turning moments of opposite sense, mechanism for transmitting turning moments of selected sense to the abutment, said last named mechanism including members forming a releasable coupling through which turning moments are transmitted to the abutment, said members being capable of limited movement in either of two directions depending upon the sense of the turning moments transmitted to the abutment, and means actuated by movement of said members in either direction for decreasing the fuel supply to the engine when said movement exceeds a predetermined value.

7. Apparatus of the character described comprising an engine-driven variable-speed power transmission capable of alternately producing turning moments of opposite sense, said transmission including an abutment and mechanism for transmitting turning moments of one sense to said abutment, said mechanism comprising members capable of limited movement under the influence of turning moments transmitted by the mechanism, and means for controlling the power of the engine, said means acting in response to movement of said members to reduce the power developed by the engine only when said movement exceeds a predetermined value.

8. Apparatus of the character described comprising an engine-driven variable-speed power transmission capable of alternately producing turning moments of opposite sense, said transmission including an abutment and mechanism for transmitting turning moments of one sense to said abutment, said mechanism comprising members capable of limited movement under the influence of turning moments transmitted by the mechanism, and means for controlling the power of the engine, said means acting in response to movement of said members to reduce the power developed by the engine only when said movement exceeds a predetermined value, and means for controlling the fuel supply to the engine, said means comprising parts actuated by movement of said members, said parts being arranged so that movement thereof acts to appreciably decrease the power developed by the engine only when the movement of said parts exceeds a predetermined value.

9. Apparatus of the character described comprising an engine-driven variable-speed power transmission capable of alternately producing turning moments of opposite sense, said transmission including an abutment and mechanism for transmitting turning moments of one sense to said abutment, said mechanism comprising a movable, resilient member through which turning moments are transmitted to the abutment and spring means for holding said member in a given position, said spring means being arranged to permit limited movement of said resilient member when the turning moments transmitted to the abutment exceed a predetermined value, and means for controlling the power developed by the engine, said last named means being actuated by movement of said resilient member to decrease the power developed by the engine.

In testimony whereof I have affixed my signature.

FREDRIK LJUNGSTRÖM.